United States Patent
Joung et al.

(10) Patent No.: US 9,749,155 B1
(45) Date of Patent: Aug. 29, 2017

(54) METHOD OF BLINDLY ESTIMATING WCDMA OVSF CODE FOR SIGNAL ANALYZER

(71) Applicant: INNOWIRELESS CO., LTD., Seongnam-si, Gyeonggi-do (KR)

(72) Inventors: Jin Soup Joung, Seongnam-si (KR); Joo Hyeong Lee, Seoul (KR); Yong Hoon Lim, Seoul (KR); Kyoung Hwan Ju, Suwon-si (KR)

(73) Assignee: INNOWIRELESS CO., LTD., Seongnam-si (KR)

( * ) Notice: Subject to any disclaimer, the term of this patent is extended or adjusted under 35 U.S.C. 154(b) by 0 days.

(21) Appl. No.: 15/416,481

(22) Filed: Jan. 26, 2017

(30) Foreign Application Priority Data

Feb. 17, 2016 (KR) ........................ 10-2016-0018310

(51) Int. Cl.
*H04B 1/707* (2011.01)
*H04L 25/02* (2006.01)

(52) U.S. Cl.
CPC ......... *H04L 25/0238* (2013.01); *H04B 1/707* (2013.01); *H04L 25/0204* (2013.01)

(58) Field of Classification Search
CPC .. H04B 1/707; H04L 25/0204; H04L 25/0238
See application file for complete search history.

(56) References Cited

U.S. PATENT DOCUMENTS

| 2002/0122470 A1* | 9/2002 | Heikkila | H04B 1/71052 375/147 |
| 2009/0274198 A1* | 11/2009 | Bastug | H04B 1/70735 375/150 |
| 2013/0189927 A1* | 7/2013 | Wu | H04J 11/005 455/63.1 |

FOREIGN PATENT DOCUMENTS

| KR | 10-2005-0118083 A | 12/2005 |
| KR | 10-2007-0091138 A | 9/2007 |

* cited by examiner

*Primary Examiner* — David B. Lugo
(74) *Attorney, Agent, or Firm* — Novick, Kim & Lee, PLLC; Jae Youn Kim

(57) ABSTRACT

Provided is a method of blindly estimating WCDMA OVSF of a signal analyzer, which includes: (a) setting SF to 512 and an index thereof to 0; (b) calculating a power average value of a symbol obtained by despreading descrambled data with an OVSF code set by increasing the index from '0' by '1'; (c) determining an OVSF code by which the power average value is equal to or greater than a power reference value as a used OVSF code candidate and determining an OVSF code by which the power average value is less than the power reference value as an unused OVSF code; (d) comparing a zero crossing rate of a symbol with a reference value to determine whether the OVSF code candidate is the used OVSF code; and (e) repeating (b) to (d) while reducing the SF half by half until the SF is equal to 4.

8 Claims, 6 Drawing Sheets

METHOD OF BLINDLY ESTIMATING WCDMA OVSF CODE FOR SIGNAL ANALYZER

BACKGROUND OF THE INVENTION

1. Field of the Invention

The present invention relates to a method of blindly estimating a wide band code division multiple access (WCDMA) orthogonal variable spreading factor (OVSF) code for a signal analyzer, and more particularly, to a method of blindly estimating a WCDMA OVSF code for a signal analyzer, which is capable of exactly and rapidly detecting an OVSF code at a small amount of calculation by using a zero crossing rate (ZCR).

2. Description of the Related Art

As well known in the art, WCDMA that is one of third-generation (3G) wireless communication systems described in 3GPP TS.25 is an asynchronous communication system having a chip rate of Fc=3.84 Mcps.

Conventionally, a base station and a terminal share connection information including, for example, a primary scramble code (PSC), a spreading factor (SF), a transport format combination indicator (TFCI), etc., such that the base station and the terminal may perform high-speed data communication based on the corresponding connection information during a process of decoding a physical layer signal.

To the contrary, since a signal analyzer for analyzing a reverse WCDMA signal tests a device under test (DUT) to detect a defect in a state that user equipment is abnormally operated, so that other mal-functional elements are added when the connection information described above is obtained from a user or extracted from an upper layer signal, the signal analyzer for analyzing a reverse WCDMA signal is unsuitable. Thus, it is very important that a signal analyzer for signal analysis is operated to exactly estimate the lowest level of information from a signal without any connecting operations.

In a WCDMA system, a receiver detects a reverse WCDMA signal by performing cell search and physical layer synchronization through following three steps.

First step: Slot synchronization is obtained by synchronizing sample/chip boundary through a primary synchronization channel (PSCH).

Second step: Frame synchronization and a scrambling code group are obtained through a secondary Synchronization Channel (SSCH).

Third step: fractional sample/chip boundary synchronization, scrambling code index synchronization and channel estimation are performed through a common pilot channel (CPICH).

Specifically, since a spreading code is applied to the reverse CPICH signal in the third step, it is known which a signal is used, so that it is very easy to detect it. When the CPICH can be decoded, it is possible to estimate a channel and it is possible to exactly detect a remaining DPxCH signal such as a dedicated physical data channel (DPDCH) signal or a dedicated physical control channel (DPCCH). By using the detected CPICH signal, the frequency offset, timing offset, phase offset and channel of an original signal are estimated to be compensated.

Meanwhile, in the WCDMA system, the spreading of each channel includes a channelization operation and a following scrambling operation. In the channelization operation, each data symbol is converted into a plurality of chips by being multiplied by a channelization code which is a binary sequence of '1' and '0', where the number of chips per data symbol is called a spreading factor (SF). The channelization code is an orthogonal variable spreading factor having a spreading factor from at least 4 to at most 512 (in a case of a down link). As a result, while the scrambling codes are used to distinguish base stations or cells from one another, the channelization codes are used to distinguish mutually different physical channels (user equipment) in each cell from one another.

According to the related art, to obtain a data symbol from a WCDMA signal, after descrambled data are despread with all possible OVSF codes, the used OVSF code is estimated through a maximum likelihood scheme. However, due to the characteristics of OVSF codes in which parent and child branches are not orthogonal with each other, at least two OVSF codes concerned with parent and child branches may be estimated so that the accuracy of the estimation is deteriorated.

(Patent document 1) Related art 1: Korean Unexamined Patent Publication No. 10-2007-0091138 (Title of the invention: Method and apparatus for estimating channelization codes in wireless transmit/receive unit)

(Patent document 2) Related art 2: Korean Unexamined Patent Publication No. 10-2005-0118083 (Title of the invention:)Apparatus and method for allocating OVSF Code AND I/Q channel for reducing peak-to-average power ratio in transmitting data via enhanced up-link dedicated channel in WCDMA system)

SUMMARY OF THE INVENTION

To solve the problems described above, one object of the present invention is to provide a method of blindly estimating a WCDMA OVSF code for a signal analyzer, which is capable of exactly and rapidly detecting an OVSF code at a small amount of calculation by using a zero crossing rate (ZCR).

To achieve the objects described above, according to one aspect of the present invention, there is provided a method of blindly estimating a wideband code division multiple access (WCDMA) orthogonal variable spreading factor (OVSF) of a signal analyzer, which includes: (a) setting an initial spreading factor (SF) to 512 and an index (idx) thereof to 0; (b) calculating a power average value of a symbol obtained by despreading descrambled data with an OVSF code set by increasing the index (idx) from '0' by '1'; (c) determining an OVSF code by which the power average value is equal to or greater than a power reference value as a used OVSF code candidate and determining an OVSF code by which the power average value is less than the power reference value as an unused OVSF code; (d) comparing a zero crossing rate of a symbol, in which a power of the symbol obtained with the OVSF code candidate is less than the power average value and a zero crossing occurs in the symbol, with a reference value ($T_{ZCR}$), and determining the OVSF code candidate as the used OVSF code when the power of the symbol is equal to or less than the reference value while determining the OVSF code candidate as the unused OVSF code when the power of the symbol exceeds the reference value; and (e) repeating (b) to (d) while reducing the SF half by half until the SF is equal to 4.

Even when the power of the symbol is less than the power average value and the zero crossing rate of the symbol in which the zero crossing occurs exceeds the reference value ($T_{ZCR}$), if the symbol is continuously distributed within a partial section, the partial section is regarded as a DTX section and excluded from a calculation of the zero crossing rate.

A code domain power of a code corresponding to the symbol is used as the power average value of the symbol.

The power average value is varied with a maximum value of all CDPs and a length of the SF.

The OVSF code, which belongs to a same branch with the OVSF code determined as the used OVSF code among OVSF codes having relatively long lengths, is excluded from the candidate without requiring to compare the power average value of the despread symbol with the reference value ($T_{CDP}$) when estimating an use of the OVSF code having an SF code of a short length.

According to the method of blindly estimating a WCDMA OVSF code of the present invention, the OVSF code can be very exactly and rapidly detected at a small amount of calculation by using the ZCR and thus, items concerned with the signal quality, such as an error vector magnitude (EVM), a code domain power (CDP), a code domain error (CDE), etc., specified in 3GPP can be analyzed.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Hereinafter, a method of blindly estimating a WCDMA OVSF code for a signal analyzer according to a preferable embodiment of the present invention will be described with reference to the accompanying drawings.

Figure 1:
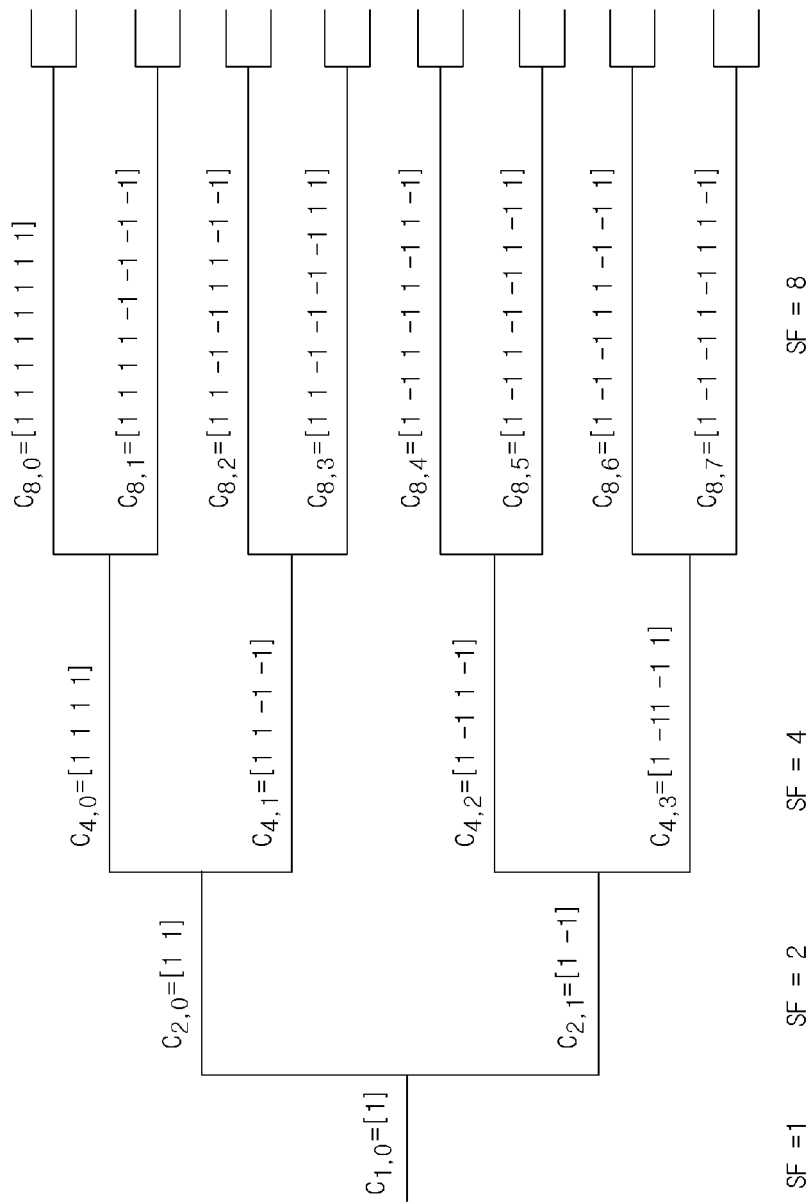
FIG. 1 is a diagram showing a tree structure of OVSF codes used in a WCDMA system.

FIG. 1 shows a tree structure of OVSF codes used in a WCDMA system. As shown in FIG. 1, OVSF codes having the same SF value are orthogonal with each other. Two codes having mutually different SF values are orthogonal with each other only when one of the two codes one having a higher SF value than that of the other cannot be generated from the other. For example, when SF=4, $C_{ch,4,0}$=(1,1,1,1) is orthogonal with $C_{ch,2,1}$=(1,−1) and not with $C_{ch,2,0}$=(1,1).

According to the principle described above, when comparing the OVSF codes with $C_{ch,2,0}$=(1,1), since the OVSF codes having indexes (idx) in the range of 0 to 3 may be generated from $C_{ch,2,0}$=(1,1), the OVSF codes are not orthogonal with each other. To the contrary, since the OVSF codes having indexes in the range of 4 to 7 cannot be generated from $C_{ch,2,0}$=(1,1), the OVSF codes are orthogonal with each other.

As the result, the higher the data transmission rate required is, the lower the SF value of the OVSF code used is. When a plurality of physical channels is transmitted at the same time, OVSF codes must be necessarily assigned to be orthogonal with each other.

Meanwhile, when it is assumed that any distortions are not caused due to a noise and a channel, the relation between the mi-th symbol $S(m_1)$ which is spread with $SF_0$ and $idx_0$ and a given SF/idx is expressed as following Equation 1.

$$X(t_1)=S(m_1)*OVSF(n_1), \forall n_1=0,\ldots,(SF-1) \quad \text{[Equation 1]}$$

In Equation 1, the $X(t_1)$ is a WCDMA reception signal, the $S(m_1)$ is the mi-th symbol, and the $OVSF(n_1)$ is an original OVSF code ($SF_0$ & $idx_0$). In this case, the detection of a symbol may be expressed as following Equation 2.

$$Y(m_1)=\text{sum}[S(m_1)*OVSF(n_1)*OVSF_2(n_1)]/SF, \forall n_1=0,\ldots,(SF-1) \quad \text{[Equation 2]}$$

In Equation 2, the $OVSF_{2(n_1)}$ is an OVSF code to be used. Thus, the reception symbol $Y(m_1)$ may be expressed as following Equation 3.

$$Y(m_1)=S(m_1), \text{ if } OVSF=OVSF_2$$

$$Y(m_1)=0, \text{ if } OVSF \neq OVSF_2 \quad \text{[Equation 3]}$$

However, as described above as the problem of the related art, because of the orthogonal property of the OVSF code, Equation 3 is valid even in the case of $SF_0<SF_0/2$. For example, even in the case of $C_{ch,8,0}$=[1,1,1,1,1,1,1,1], $C_{ch,4,0}$=[1,1,1,1] and $C_{ch,2,0}$=[1,1] of FIG. 1, Equation 3 may be valid. In this case, the SF value (length) cannot be exactly distinguished. That is, according to an estimation method of the related art, it cannot be determined whether a used OVSF code is $C_{ch,8,0}$=[1,1,1,1,1,1,1,1], $C_{ch,4,0}$=[1,1,1,1] or $C_{ch,2,0}$=[1,1].

In consideration of the above, according to the present invention, there is proposed a method of exactly estimating an SF value by using a ZCR.

Figure 2:
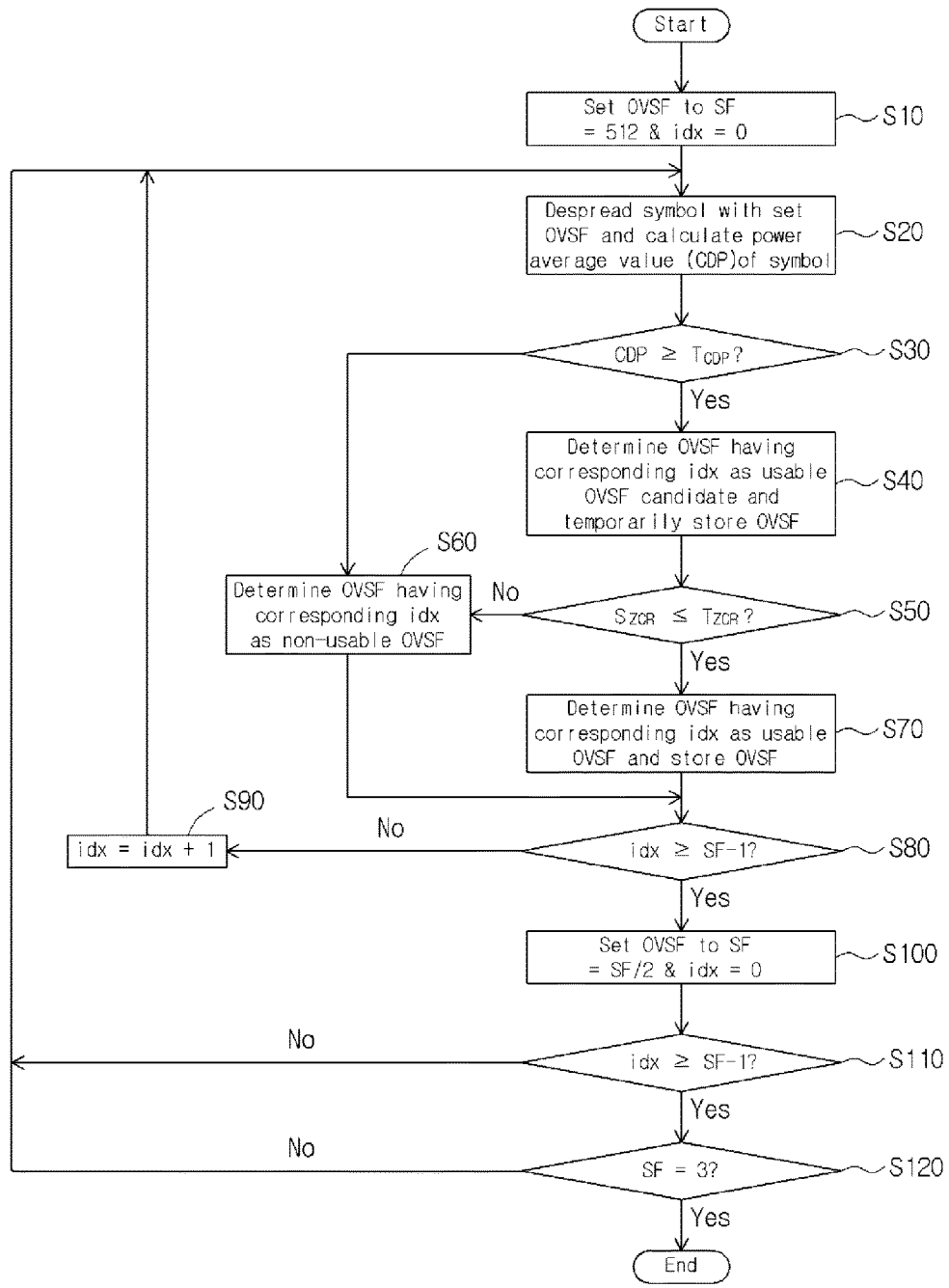
FIG. 2 is a flowchart illustrating a method of blindly estimating a WCDMA OVSF code for a signal analyzer according to the present invention.

FIG. 2 is a flowchart illustrating a method of blindly estimating a WCDMA OVSF code for a signal analyzer according to the present invention.

First, a signal analyzer down-converts an RF signal received from a base station to obtain a base band IQ signal corresponding to an amount of one frame and A/D-converts the base band IQ signal. Then, the signal analyzer descrambles the A/D-converted base band IQ signal with a suitable scrambling code to obtain descrambled IQ data. The present invention may be performed with such descrambled IQ data (hereinafter, the present invention will be described without distinguishing I and Q from each other).

First, in step S10, an SF is set to have the longest length of 512 (=$2^9$), and the idex (idx) is set to be '0'. In step S20, the power average value of a symbol obtained by despreading the descrambled data with the set OVSF code is calculated. The code domain power (CDP) of the corresponding code may be used as the power average value of the symbol.

Then, in step S30, it is determined whether the power average value (CDP) of the symbol despread with the corresponding OVSF code is equal to or greater than a predetermined power reference value ($T_{CDP}$). In this case, the power reference value may be expressed as following Equation 4.

$$T_{CDP}=\text{CDP\_max}-3*(\text{int})[\log(SF)/\log(2)+0.5] \quad \text{[Equation 4]}$$

In Equation 4, "int" represents an integer of an internal calculation value of [ ], and the power reference value $T_{CDP}$ is not a fixed value but varied with the maximum value of CDP and a length of SF, so that the accuracy of estimation may be reconsidered.

As the determination result of step S30, when the symbol power average value (CDP) is equal to or greater than the predetermined power reference value ($T_{CDP}$), this means that an OVSF code sharing a sequence of at least a corresponding OVSF code or a part of the corresponding OVSF code has been used. For example, since an OVSF code such as $C_{ch,512,0}$=[1,1,1,1,1,1,1,1], $C_{ch,8,0}$=[1,1,1,1,1,1,1,1], or $C_{ch,4,0}$=[1,1,1,1] is used, the process goes to step S40 such that the OVSF code having the corresponding index (idx) is temporarily stored as a candidate of the used OVSF code.

Figure 3:
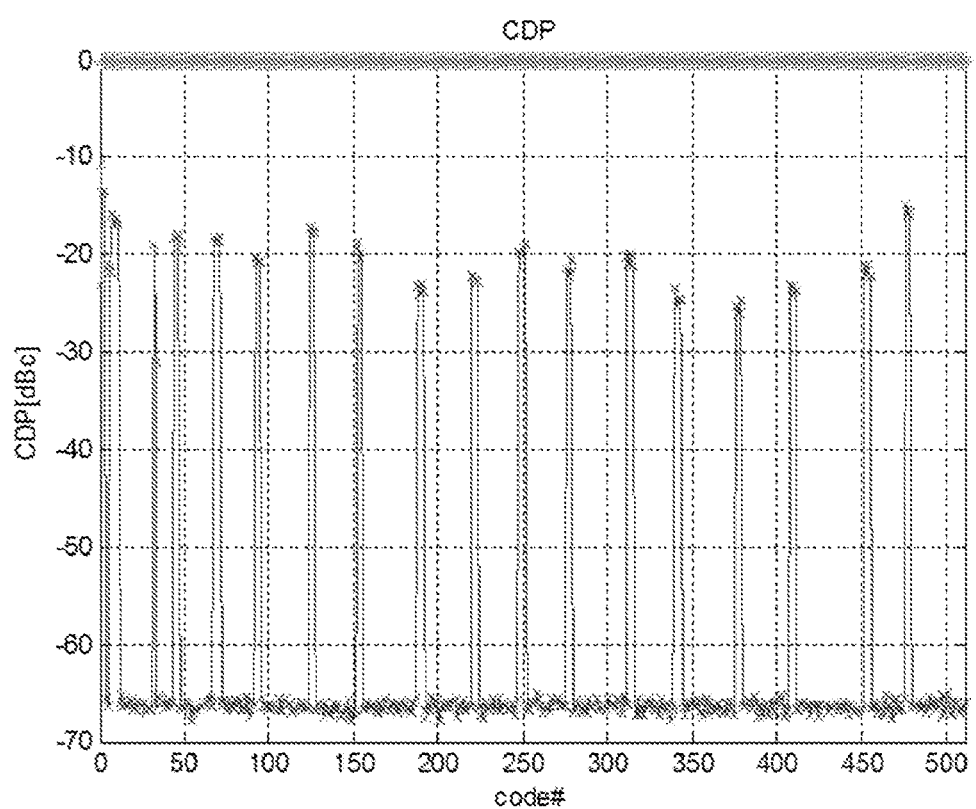
FIG. 3 is a graph illustrating one example of CDP of whole OVSF codes having SF=512 according to the present invention.
Figure 4:
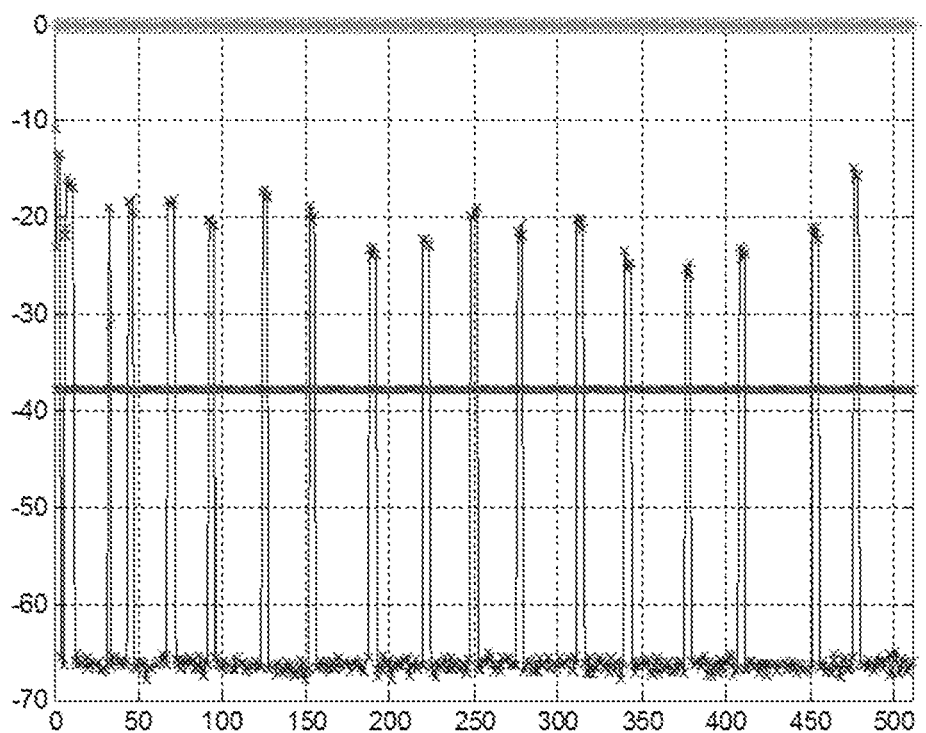
FIG. 4 is a graph illustrating OVSF codes exceeding a power reference value (green line near −38 dBc) of FIG. 3 selected as a candidate group.

FIG. 3 is a graph illustrating one example of CDP of whole OVSF codes having SF=512 according to the present invention. FIG. 4 is a graph illustrating OVSF codes exceeding a power reference value (green line near −38 dBc) of FIG. 3 selected as a candidate group. As shown in FIGS. 3 and 4, in a case of an OVSF code of SF=512, it is understood that OVSF codes of about 100 among total 512 OVSF codes are only selected as candidates of used OVSF codes.

Then, in step S50, it is determined whether the zero crossing rate $S_{ZCR}$ of the symbol despread in step S20 is equal to or less than a predetermined reference value $T_{ZCR}$. In this case, the spectrum of a signal in the transmission channel bandwidth of the WCDMA system is widely distributed, and the signal is transmitted after the scrambling process (which is a process separated from the scrambling performed with the scrambling code) which allows data patterns to be random to maintain an equalizer of a reception in an optimal state party and suitably maintains the number of bit transitions is performed, so that the symbol patterns of '1' and '−1' are repeated almost at the same number of times.

When the zero crossing rates ($S_{ZCR}$) of the symbols, of which the powers each is less than the power reference value ($T_{CDP}$) exceed a predetermined reference value ($T_{ZCR}$), for example, 10% (preferably 10% or less) of the total symbols, even though the total symbol power average value (CDP) exceeds the power reference value ($T_{CDP}$), it is determined that the possibility to use the OVSF code that belongs to the same branch and has an SF having a shorter length is high, so that step S80 is performed after it is determined in step S60 that the corresponding OVSF code is not used. The symbol zero crossing to be mentioned below represents the zero crossing of a symbol of which power is less than the power reference value ($T_{CDP}$).

Figure 5:
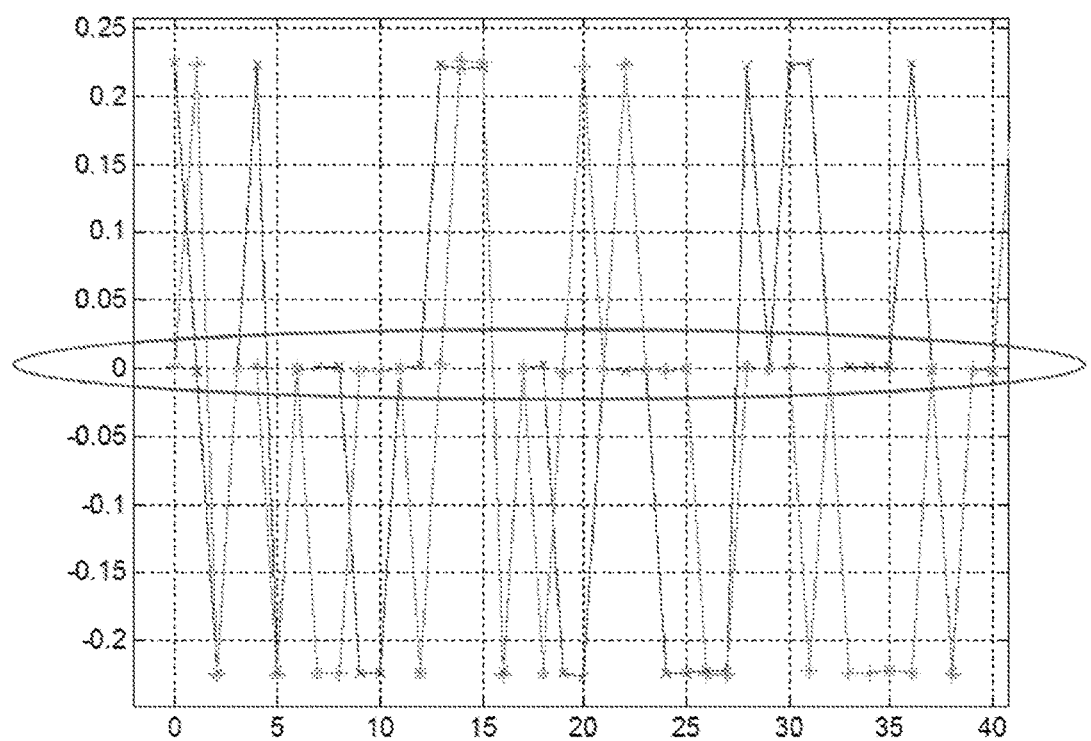
FIG. 5 is a graph illustrating a result of despreading by a determined OVSF code as a used OVSF code according to the present invention.

FIG. 5 is a graph illustrating a result of despreading by a determined OVSF code as a used OVSF code according to the present invention, where the horizontal axis represents the number of symbols and the vertical axis represents a normalized value based on a center value of the symbol powers. In FIG. 5, since the zero crossing rate (see the inside of the red ellipse) exceeds the reference value $T_{ZCR}$, it is determined that the corresponding OVSF code is an unused OVSF code.

Meanwhile, as the determination result of step S50, when it is determined that the zero crossing rate $S_{ZCR}$ of the symbol despread in step S20 is equal to or less than a predetermined reference value $T_{ZCR}$, it is determined that the possibility that the corresponding OVSF code is used is very high. Then, in step S70, the OVSF code having the corresponding index idx is determined and stored as a used OVSF code. Then, the process goes to step S80. In this regards, since the number of chips of one WCDMA wireless frame is 38,000, in a case of SF=512, total 75 symbols may be spread. In this case, as the result, the reference value $T_{ZCR}$ of the symbol zero crossing rate may be set to 7.5 or less (based on 10%).

Meanwhile, in the WCDMA system, when the data rate is changed from a high value to a low value, for the purpose of matching, a discontinuous transmission (DTX) symbol (section) which does not transmit data in TTI section is forcibly inserted. As described above, when the DTX symbol is included, although the symbol is despread with the used OVSF code, the symbol zero crossing rate exceeds the reference value, so that the symbol may be determined as an unused OVSF code.

To remove an error from the estimation, according to the present invention, when the symbols in which a zero crossing occurs is continuously distributed only within a partial section, the partial section is considered as the DTX section, so that the partial section is excluded from the calculation, thereby improving the estimation accuracy.

Figure 6:
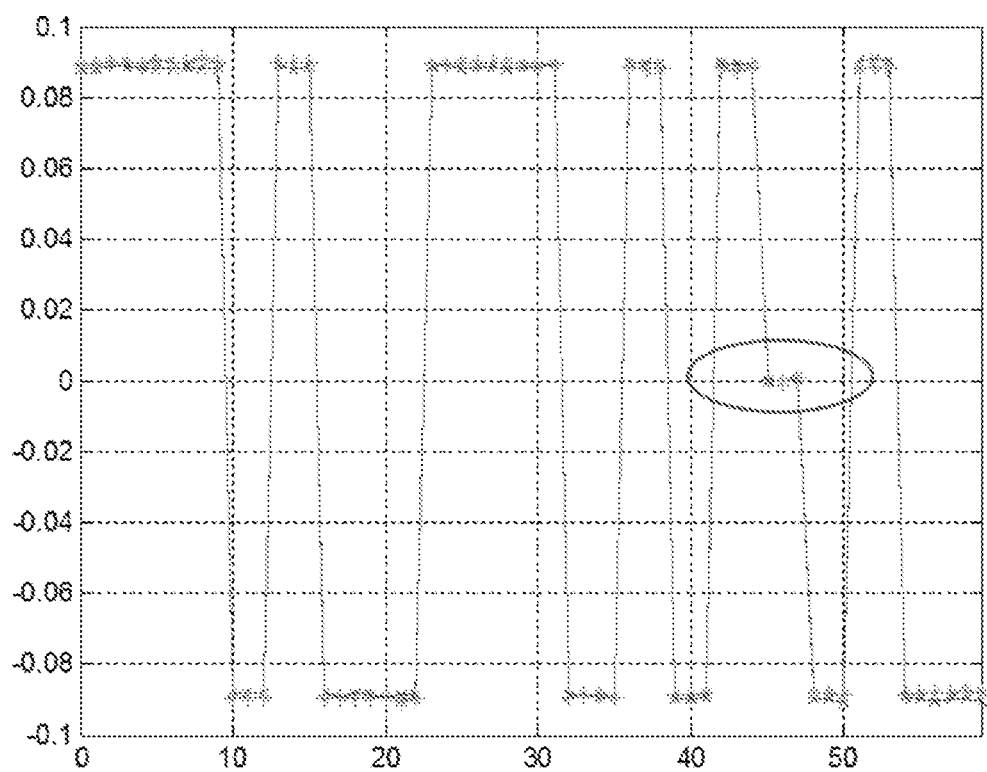
FIG. 6 is a graph illustrating a result of despreading a wireless frame including a DTX.

In FIG. 6, since, although the zero crossing rate (see the inside of the red ellipse) exceeds the reference value $T_{ZCR}$, the zero crossing continuously occurs within a partial section, the zero crossing generation section is regarded as the DTX section, so that the zero crossing generation section is excluded from the calculation of the number of zero crossings, thereby determining the corresponding OVSF code as the used OVSF code.

Returning to FIG. 2 again, in step S80, it is determined whether the current index idx arrives at SF-1. When the current index idx does not arrive at SF-1, after the current index idx is increased by '1' in step 90, the process returns to step S20. To the contrary, when the current index idx arrives at SF-1, in a state that the length of the current SF is reduced to be half in step S100, the steps S20 to S80 are repeated finally until SF=4.

As described above, according to the present invention, the used OVSF code is estimated by overall taking into consideration the symbol power, the ZCR, the DTX and the like, so that the OVSF code may be very exactly estimated without any information about the OVSF code.

Meanwhile, although it has been described with reference to FIG. 2 that, after a symbol is despread with the OVSF codes set every time, the power of the symbol is compared with the reference value, differently, after the symbol is despread with all OVSF codes concerned with the corresponding SF, the powers of the symbols may be uniformly compared with the power reference value $T_{CDP}$.

In addition, in a case of an OVSF code concerned with the same branch as that of the OVSF code determined as a used OVSF code among OVSF codes having relatively long lengths, when it is estimated whether an OVSF code having an SF code having a short length is used or not, even without need to compare the power average value of the despread symbol with the power reference value $T_{CDP}$, the OVSF code is excluded from the candidate group, so that the entire time elapsed for estimation may be greatly reduced.

As described above, although an exemplary embodiment of a method of blindly estimating WCDMA OVSF for a signal analyzer according to the present invention has been described for illustrative purposes with reference to accompanying drawings, those skilled in the art will appreciate that various modifications, additions and substitutions are possible, without departing from the scope and spirit of the invention as disclosed in the accompanying claims.

What is claimed is:

1. A method of blindly estimating a wideband code division multiple access (WCDMA) orthogonal variable spreading factor (OVSF) of a signal analyzer, the method comprising:
   (a) setting an initial spreading factor (SF) to 512 and an index (idx) thereof to 0;
   (b) calculating a power average value of a symbol obtained by despreading descrambled data with an OVSF code set by increasing the index (idx) from '0' by '1';
   (c) determining an OVSF code by which the power average value is equal to or greater than a power reference value as a used OVSF code candidate and determining an OVSF code by which the power average value is less than the power reference value as an unused OVSF code;
   (d) comparing a zero crossing rate of a symbol, in which a power of the symbol obtained with the OVSF code candidate is less than the power average value and a zero crossing occurs in the symbol, with a reference value ($T_{ZCR}$), and determining the OVSF code candidate as the used OVSF code when the power of the symbol is equal to or less than the reference value ($T_{ZCR}$) while determining the OVSF code candidate as the unused OVSF code when the power of the symbol exceeds the reference value ($T_{ZCR}$); and (e) repeating (b) to (d) while reducing the SF half by half until the SF is equal to 4.

2. The method of claim 1, wherein, even when the power of the symbol is less than the power average value and the zero crossing rate of the symbol in which the zero crossing occurs exceeds the reference value ($T_{ZCR}$), if the symbol is continuously distributed within a partial section, the partial section is regarded as a DTX section and excluded from a calculation of the zero crossing rate.

3. The method of claim 1, wherein a code domain power of a code corresponding to the symbol is used as the power average value of the symbol.

4. The method of claim 3, wherein the power average value is varied with a maximum value of all CDPs and a length of the SF.

5. The method of claim 1, wherein the OVSF code, which belongs to a same branch with the OVSF code determined as the used OVSF code among OVSF codes having relatively long lengths, is excluded from the candidate without requiring to compare the power average value of the despreaded symbol with the power reference value when estimating an use of the OVSF code having an SF code of a short length.

6. The method of claim 2, wherein the OVSF code, which belongs to a same branch with the OVSF code determined as the used OVSF code among OVSF codes having relatively long lengths, is excluded from the candidate without requiring to compare the power average value of the despreaded symbol with the reference value ($T_{CDP}$) when estimating an use of the OVSF code having an SF code of a short length.

7. The method of claim 3, wherein the OVSF code, which belongs to a same branch with the OVSF code determined as the used OVSF code among OVSF codes having relatively long lengths, is excluded from the candidate without requiring to compare the power average value of the despreaded symbol with the reference value ($T_{CDP}$) when estimating an use of the OVSF code having an SF code of a short length.

8. The method of claim 4, wherein the OVSF code, which belongs to a same branch with the OVSF code determined as the used OVSF code among OVSF codes having relatively long lengths, is excluded from the candidate without requiring to compare the power average value of the despreaded symbol with the power reference value when estimating an use of the OVSF code having an SF code of a short length.

* * * * *